Dec. 8, 1964  G. G. SOMERVILLE  3,160,044
METHOD OF CUTTING WOUND MAGNETIC CORES
Filed July 25, 1961  3 Sheets-Sheet 2

Inventor,
Gareth G. Somerville,
by Francis K. Doyle
His Attorney

Inventor,
Gareth G. Somerville,
by Francis K. Doyle
His Attorney.

United States Patent Office 3,160,044
Patented Dec. 8, 1964

3,160,044
METHOD OF CUTTING WOUND MAGNETIC CORES
Gareth G. Somerville, Pittsfield, Mass., assignor to General Electric Company, a corporation of New York
Filed July 25, 1961, Ser. No. 126,543
3 Claims. (Cl. 83—19)

This invention relates to a method of cutting steel laminations, and more particularly, to a method of cutting steel laminations which have been formed into a wound magnetic core.

In the magnetic core art, such as are used in various types of electromagnetic induction apparatus, it is common to use a build of a number of layers of steel laminations formed into the shape of the desired core. In general, there are two methods which have been used to make such cores. The first method comprises the pre-cutting of a sufficient number of separate laminations of appropriately increasing lengths to form the desired core, stacking such laminations and then forming these laminations into the desired core. The second method generally comprises winding a single strip of magnetic material about a mandrel, or the like, to form a core having the desired number of laminations. In general, this second type of core can be referred to as a spirally-wound magnetic core. Regardless of the method used, as will be understood, the magnetic core is provided with an electromagnetic coil which is placed around the core. In general, it has been found desirable to preform the coil and then to place such coil around the core, generally by means of opening the core to insert the coil around a winding leg thereof.

The first method of making cores is exemplified for example in Patent No. 2,456,457. This method requires the un-coiling of the strip material, cutting such material on a machine to the desired length, stacking the length of material in the desired quantity and then forming such laminations into a core. The second method, for example as shown in Patent No. 2,305,649, merely requires the unwinding of the lamination from a large coil which is provided by the steel mill and directly winding such strip material onto a mandrel, which gives it the desired core form. As will be clear from the above, the second method requires much less time and equipment to form the desired core, however, in order to place a preformed coil on the core, such as the spirally wound core of the second method, it is necessary to cut the laminations completely at one or two points and then to open the core or to separate the core and re-form it about the preformed magnetic coil. This is shown, for example in Patent No. 2,478,029, which is an example of a single jointed core and in Patent No. 1,935,426, which is an example of a core utilizing a plurality of joints. As will be well recognized, one of the basic problems present in the making of the spirally wound cores is the problem of obtaining the desired joint in such core.

Many methods are presently known which have been used to cut a spirally wound magnetic core, among these methods are, for example, a saw, a milling cutter, or an abrasive wheel. These cutting apparatus are often complex and costly machines and their use results in surfaces at the cutting edge which have a large number of burrs, which as will be well understood, tend to short the various laminations in the formed core. In order to remove these burrs, an additional working step has been required such as, for example, by etching, to prevent the laminations from being short circuited by such burrs. Of course, it will be readily apparent, that this additional step involves considerable expense and labor and obviously it is highly desirable in the formation of such joints in magnetic cores to eliminate the burrs formed in the cutting operation.

Recently it has been proposed to cut spirally wound cores by means of a pinch-cutting operation, as is described and claimed in Patent No. 2,947,065. In this method, the cores are first lubricated for example, such as by an oil bath, where the oil is provided with a viscosity of over 1200 centipoise at 25° centigrade. This oil bath, or other lubrication, requires the additional steps of first, getting the lubrication into the various laminations of the core, as well as later removing such lubrication from the various laminations of the core. Further, in this method the cores have generally been annealed prior to the cutting and thus, any stress which may be set up in the core due to the pinch-cutting method will add additional losses to the core when used as magnetic cores for electromagnetic induction apparatus.

From the above discussion, it will be clear that the pinch-cutting of the preformed spirally wound core has many advantages over the other cutting methods of the prior art. However, it is deemed desirable to use the pinch-cutting method without the need for a lubrication bath, or the like, in a manner specified in Patent No. 2,947,065. Further, it has been found desirable to perform the cutting operation prior to the annealing of the core, so that any stresses which are set up in the core during the cutting operation will be relieved by the subsequent annealing operation.

It is therefore, one object of this invention to provide an improved method of cutting magnetic core laminations.

A further object is to provide a pinch-cutting method which dispenses with the need for lubrication between the various laminations of the core.

A further object of this invention is to provide a method of cutting spirally wound magnetic cores prior to the annealing of such core.

A still further object of this invention is to provide a method of cutting spirally wound magnetic cores where there is no subsequent step required to remove material from the various laminations, which has been utilized in the cutting operation, and also which eliminates any subsequent step of de-burring of the jointed core.

Briefly, in accordance with one form of this invention, a spirally wound laminated core is cut by means of a wedge-shaped blade, which is forced through the laminations while the laminations are held in a stressed condition.

The invention which it is desired to be protected will be clearly pointed out and distinctly claimed in the claims appended hereto. However, it is believed that this invention, and the manner in which its objects and advantages are obtained, as well as other objects and advantages thereof, will be better understood from the following detailed description of a preferred embodiment thereof, when taken in connection with the accompanying drawings, in which:

Figure 1:
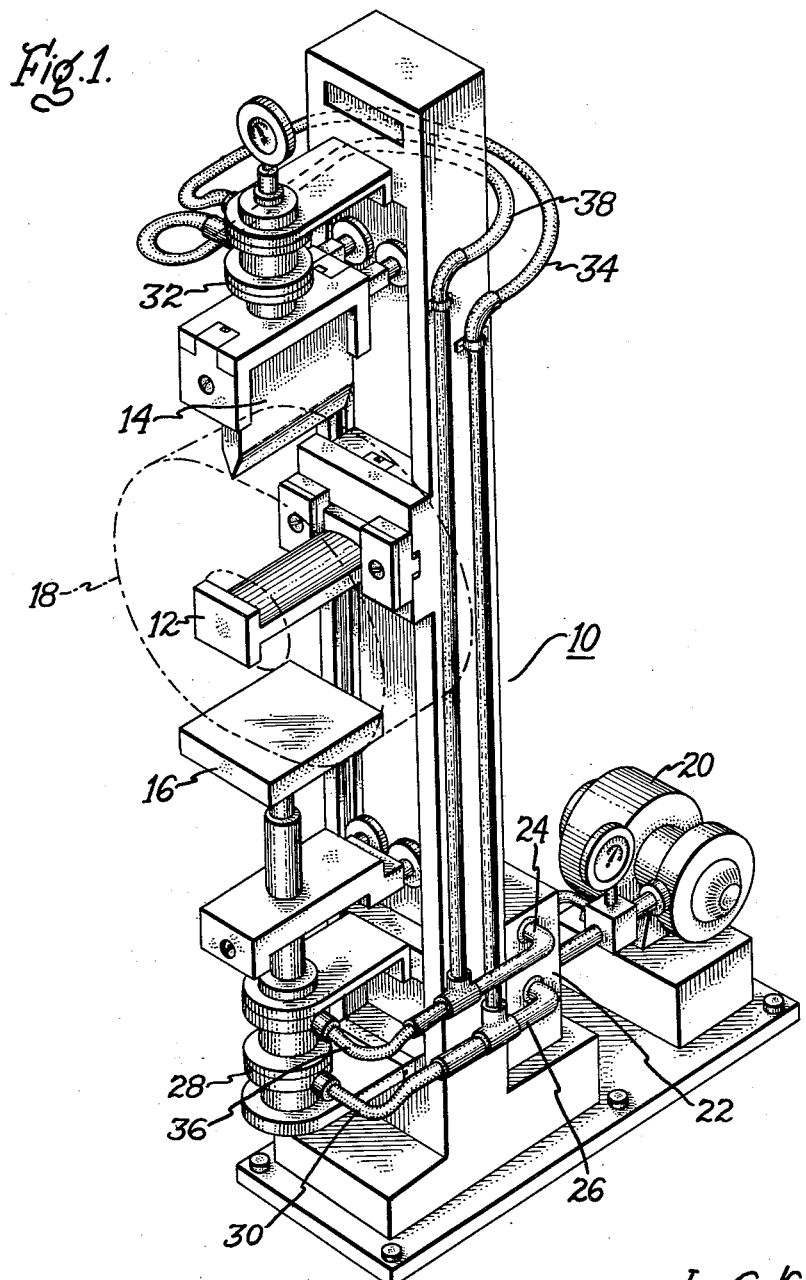
FIGURE 1 is a perspective view of one form of a machine which may be used in carrying out the method of this invention.

Referring now to the drawings, in which like numerals are used to indicate like parts throughout the various views thereof, and referring particularly to FIGURE 1, there is shown a hydraulic press, generally indicated as 10, which comprises a stationary anvil 12, a movable blade member 14, and a movable table 16. As will be understood, by means of the hydraulic press 10 a core shown in phantom as 18 may be placed upon the stationary anvil 12, then the movable table 16 and the movable blade 14 may be brought into contact with such magnetic core and, compressing such core in between the movable table 16 and the movable blade 14 stresses are set up within the core member 18. Further force applied by means of blade 14 will quickly separate the various laminations, which comprise the magnetic core 18, in a manner to be more clearly and fully described hereinafter.

As will be readily understood by those skilled in this art, a pump 20 is provided which generates the desired pressure on the hydraulic fluid maintained in the reservoir member 22, such hydraulic fluid being brought out from the reservoir 22 by means of the lines 24 and 26, in response to the actuation of control members (not shown). As will be understood, the fluid coming out of pipe 26 is brought to the lower hydraulic cylinder 28 by means of line 30 and is used to force the movable table 16 in an upward direction. In the same manner, fluid from the line 26 is brought to the upper hydraulic cylinder 32 by means of the line 34 to thereby force the upper cylinder to actuate blade member 14 into a downward direction. When it is desired to remove or return the blade 14 and table 16 to their loading position, then hydraulic fluid is pumped through the lines 24 and line 36 to the cylinder 28 thereby returning table 16 to its desired lower position. In a similar manner, liquid pumped from line 24 to upper cylinder 32 through line 38 is used to return the blade member 14 to its upward position. Thus it is seen that the hydraulic press member 10 operating through conventional controls (not shown) may be utilized to move table 16 and blade 14 into contact with a laminated core member 18, which is mounted upon a stationary anvil 12; apply a predetermined stress to such laminated core and then force the blade through such core thereby parting each of the separate laminations.

Figure 2:
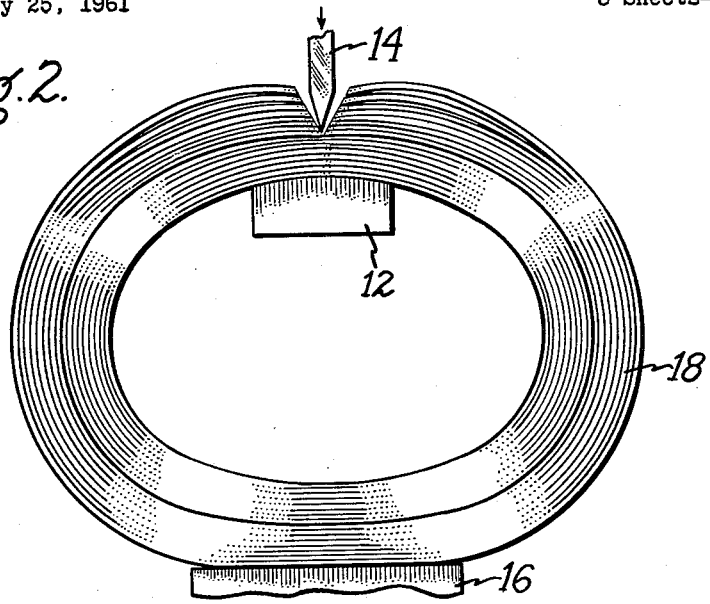
FIGURE 2 is a plan view of a spirally wound laminated core shown in the machine of FIGURE 1, during the cutting thereof.

Referring now to FIGURE 2 of the drawing, the core member 18 is shown in full lines with the table member 16, the stationary anvil 12, and the blade member 14. As can be seen, by means of the pressure applied by the movable table 16 and blade member 14, the laminated core has been forced into an egg or oval shape. Suitable stops (not shown) are provided to control the pressure applied by table 16. The continued pressure of blade 14 on the separate laminations of the core member 18, causes each of such laminations to be separated and to spring away from the blade member, in the manner shown in FIGURE 2. This action of the stress, which has been built up in the core member 18 by means of the compression between the movable table 16 and the movable blade 14, is more clearly shown, especially in FIGURE 3.

Figure 3:
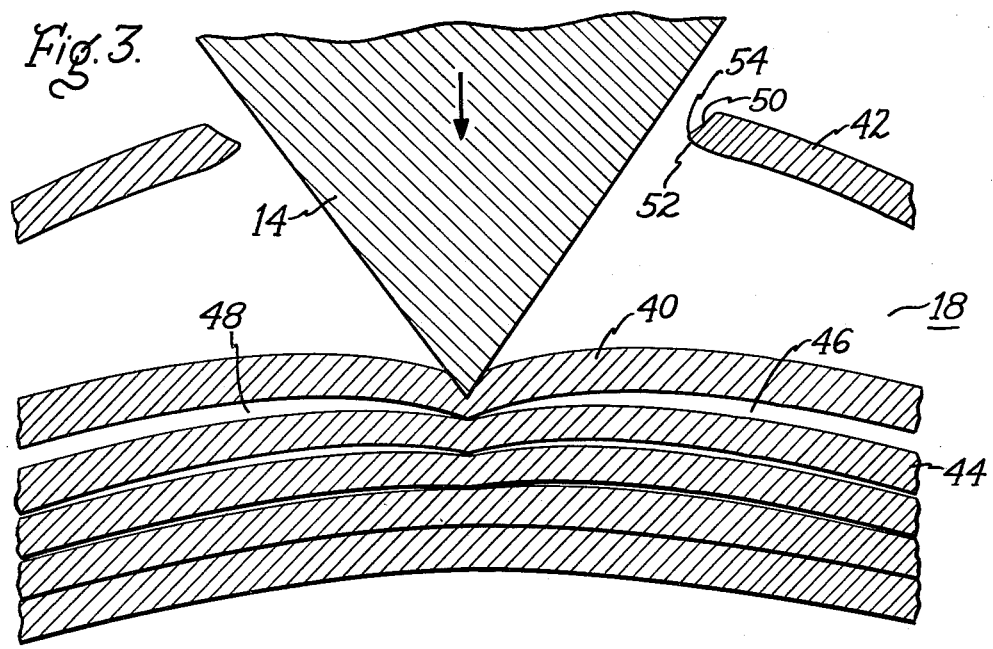
FIGURE 3 is an expanded view of a series of laminations showing one form of core being cut according to this invention.

As will be well understood by those skilled in the magnetic core art, the spirally wound magnetic core may be wound by means directly winding the laminated strip material onto a mandrel in a circular fashion, thereby providing certain stresses in the various turns of the spirally wound core. These winding stresses will tend to pull the core members apart, as will be hereinafter further described. Another method which may be utilized is to wind such laminated strip material onto a mandrel by first applying a certain stress or curl to the strip material in the direction of the winding, to thereby tend to cause the material to remain in its wound condition. FIGURES 2 and 3 provide examples of a core member which has been wound by means of providing a stress or curl to the strip material as it is wound on the mandrel (not shown), which will cause the material to tend to stay in its wound form. Thus, in FIGURE 2 as can be seen, as the material of each lamination is parted by means of the blade 14, the stress which is forced into the core member 18 by means of the pressure of the blade 14 and the table 16 will cause the various laminations of core member 18 to move away from the blade member 14 without at the same time causing it to spring out, as would be true were the core member not first stressed or curled in the direction of winding.

Referring now to FIGURE 3 of the drawing, which shows an expanded view of the parting of the separate laminations, shown fully in FIGURE 2, it can be seen that blade member 14 is forced into a lamination 40 of the core member 18 as indicated by the point of the blade member 14 within the lamination 40. The lamination 42, which has already been parted, has sprung away from the blade member 14 and therefore does not provide any friction or galling action on the blade member 14. Considering the lamination 40, it can be seen that at the point or area of the lamination 40, where the compressive force of the blade 14 is applied, that the lamination tends to be forced in a downward direction, thereby causing the portions of the laminations on each side of such point to be raised to some extent from the next lower lamination 44. As can be seen, the large open areas 46 and 48 between laminations 40 and 44 on each side of the blade member 14 is caused by the compressive force of blade member 14 into the lamination 40; thus causing the outer portions to separate from the next lower lamination 44. Inasmuch as the core member 18 has already been pre-stressed, by means of the compressive forces of the table 16 and blade member 14, the additional compressive force of blade member 14 in cutting through the lamination 40 causes the outer portions of the lamination to move away from the next lower lamination 44, in the manner shown. Since the portion of the lamination 40 on each side of blade member 14 is raised from the next lower lamination 44, it can be seen that there is very little friction generated between the contacting portion of the lamination 40 and its next lower lamination 44; therefore, relatively little force is required to overcome such friction and thereby cause the ends of lamination 40 at the cutting area to be pulled apart. Referring specifically to lamination 42, the particular shape of the parted edge of the lamination, which is formed by means of the cutting method of this invention, can be clearly seen. Where the blade member 14 is forced into lamination 42, it causes a sloping cut edge 50. At the same time, the lower portion of the separated lamination has a rounded edge portion 52 which is believed to be caused by the forcing of the upper lamination into the next lower lamination. These edges 50 and 52 come together at a substantial point 54, which is the area in which the compressive force of blade member 14 and the stress in the lamination, causes the lamination to separate. As will be understood, inasmuch as the blade does not completely force itself through lamination 42, but rather causes the bottom of the portion of the lamination to be separated due to the forces normal to the line of compression, no burrs are formed on the lamination which would tend to contact the next lower lamination when such core is formed as a magnetic core.

By means of the method of this invention, it has been found that a pre-stressed laminated core, such as shown in FIGURES 2 and 3, can be readily separated without use of lubricants as taught in Patent No. 2,947,065, very rapidly and without the formation of burred ends on the cuts. This is totally unexpected, since normally without a lubrication, as taught in Patent No. 2,947,065, it would be expected that the various surfaces of the adjacent laminations would tend to be forced together by the blade 14, thereby generating substantial friction in the attempt to separate such surfaces and thereby cause stalling or galling of the blade. However, by means of this invention, and especially by means of applying the pre-stressing to the magnetic core, it has been found that the blade may be caused to open the core substantially as fast as the hydraulic press 10 can be closed.

Figure 4:
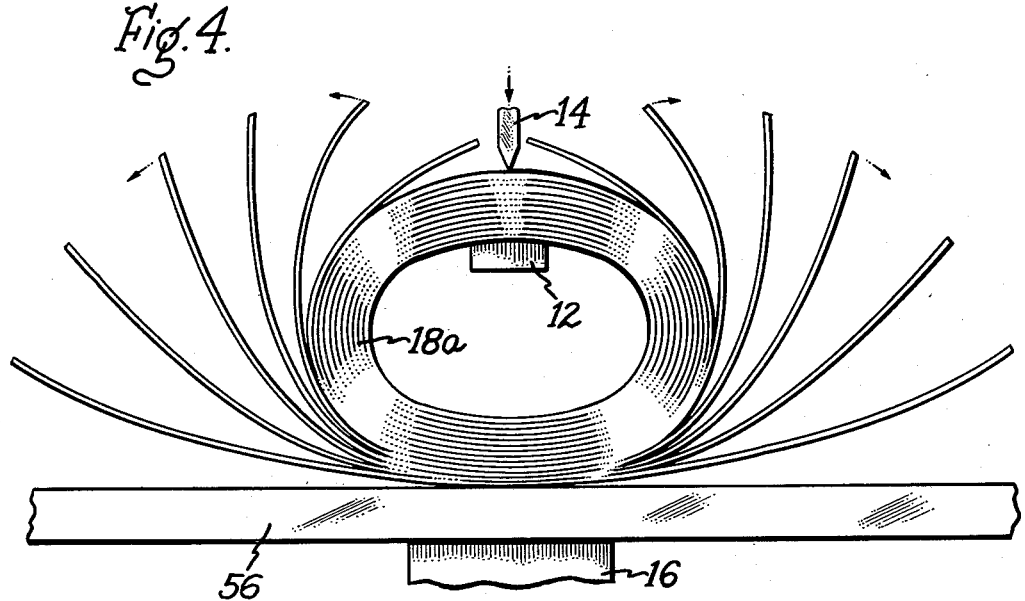
FIGURE 4 is a diagrammatic showing of another type of core being cut by the method of this invention.

Referring now to FIGURE 4 of the invention, there is shown a diagrammatic view of another type of core being cut by means of the method of this invention. The core 18a, shown in FIGURE 4, is an example of a core which would be wound directly from the strip material as received from the mill without stressing or curling. Therefore, the material has a tendency to unwind or spring open. Because of the tendency of the core member 18a to spring open, a plate member 56 has been placed on table member 16 so that as the laminations of the core fly open after parting they will not tend to be distorted. As can be seen from FIGURE 4, as the blade member 14 is forced through the different laminations of the core member 18a, the laminations spring open, away from the blade member 14 and down flat against a plate member 56, which is mounted on the table member 16. Of course, in order to aid in the cutting of the core member 18a, it is placed in a machine in the same manner as the core member 18, and a stress is provided to the core by means of the compressive forces set up between the plate member 56 on table 16 and the cutting member 14. As will be seen from FIGURE 4, the core member 18a has also been compressed into a substantial egg or oval shape in the same manner as the core member 18.

Figure 5:
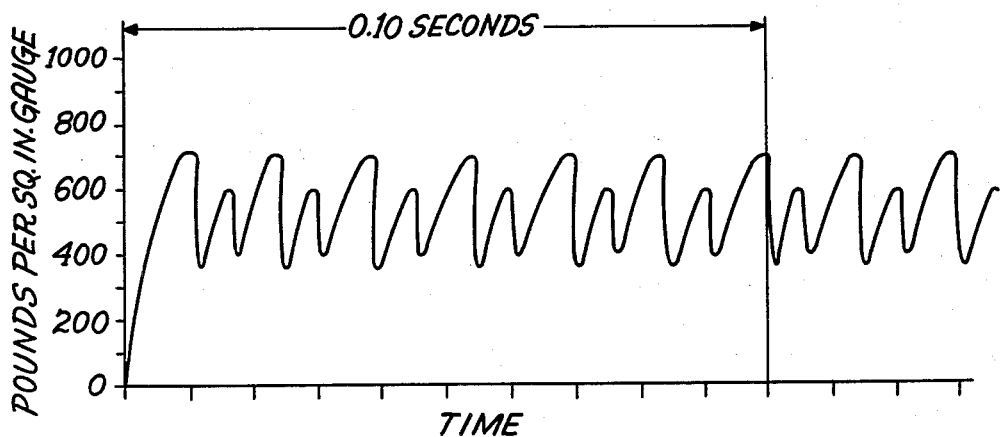
FIGURE 5 is a drawing of an oscillograph chart which shows the forces applied in cutting the cores by the machine shown in FIGURE 1.

Referring now to FIGURE 5 of the drawing, there is shown a chart of an oscillograph which indicates the pulsing type of pressure which results from the parting action of the blade in this method of the invention. This chart, of course, is drawn from a recording of the pressure developed during operation of the hydraulic press which is shown in FIGURE 1 of the drawing. As can be seen from the chart in FIGURE 5, as the blade and table come together on the core member, pressure is built up until it reaches a peak in the vicinity of 700 pounds per square inch gage. During this build up of pressure the point of blade member 14 is forced into the lamination. At the high pressure point, apparently the blade member 14 begins to rapidly go through such lamination with a substantial decrease in pressure until the lamination is parted and the blade immediately drops into the second lamination. This can be seen by the almost straight-line drop from the high pressure during the entry of the blade into the lamination to the bottom of the pressure line where the blade has entered the second lamination. As can be seen, the pressure gradually builds up on the second lamination until it reaches a smaller peak, in the vicinity of 600 pounds per square inch gage, at which time the blade rapidly goes through the remaining portion of the second lamination and drops to a low pressure which is not as low as the pressure in the first instance. It is believed this is bceause, in the parting of the first lamination the blade rapidly goes through the remaining portions of the first lamination and, due to its inertia, embeds itself to some extent into the second lamination. Therefore, a lesser force is required for parting the second lamination. However, after the parting of the second lamination, the blade begins to force its way through the third lamination and again builds up to the high pressure found in the cutting of the first lamination. As this peak is reached, as can be seen in FIGURE 5, the blade rapidly goes through the third lamination and again, it is believed, embeds itself into the fourth lamination to thereby provide a start on cutting of the fourth lamination.

Considering the oscillograph chart shown in FIGURE 5, it can be seen that each of the odd-numbered laminations require a much higher pressure in terms of pounds per square inch gage to cause a separation of the lamination. That is, the hydraulic press reaches a higher peak pressure in the separation of the odd-numbered laminations than it does in the separating of the even numbered laminations. As hereinbefore mentioned, this is believed due to the fact that when the odd-numbered laminations separate, the blade rapidly is driven towards the even numbered lamination and embeds itself into such lamination, to thereby provide a start on the separating of such lamination. This would account for the requirement of a lesser pressure peak in separation of the even numbered laminations than the odd-numbered laminations.

In the practice of this invention, of course it will be understood that the invention is not limited to a hydraulic press since it is obvious that any type of press may be utilized. For example, air pressure, mechanical pressure, or an impulse machine may be utilized rather than the hydraulic machine as shown. The blade member is generally normal tool steel which has been hardened to about a Rockwell C 60 hardness. It has been found that a blade of such hardness gives satisfactory life in the separation of laminated cores in the method of this invention. It has also been found that a cutting angle between the wedge-shaped blade of approximately 40 to 45° appears to provide the best cut. However, the angle of the blade may vary from 35 to 55° without unduly changing the ability of the blade used in this method to provide the desired cutting of the laminated core. It has been found that when the angle is changed beyond 35 to 55° that the life of the blade is substantially diminished, due to the extreme forces provided on the width of the blade where the blade is too thick and the extreme forces provided at the point of the blade where the sides of the blade are too narrow. The cutting edge of the blade is not sharp, as would be considered in the case of a knife, and after grinding of the blade to the desired angle the point or edge of the blade is ground or stoned off to provide a small blunt edge. As indicated by the oscillograph chart, in utilizing a hydraulic press or ram of the type shown in FIGURE 1, it has been found that the maximum gage pressure necessary is in the vicinity of 700 pounds per square inch gage, and this pressure drops to a low point of substantially 390 pounds per square inch gage during the cutting of the odd laminations. In cutting of the even laminations it is found that the maximum pressure is approximately 600 pounds per square inch gage while the low pressure is approximately 400 pounds per square inch gage. Of course it will be understood that with a change in either the hydraulic ram or other methods of operating the blade, or with changes in the various types of core steel, the pressure necessary to part the various laminations may change, depending upon the conditions of the blade, the ram, and the laminated steel being parted.

From the above it can be seen there has been provided a method of cutting or parting laminations of a magnetic core by utilizing a blade in a so-called pinch-cutting method, whereby it is not necessary to provide any lubrication between the various laminations of the core member. The method of cutting, as provided in this invention, provides a substantially even cut along the cut edges of the lamination without the formation of the burrs and without any undue damage to the laminations.

While there has been shown and described the preferred embodiment of this invention, it will be understood by those skilled in the art, that various changes and modifications may be made in the preferred embodiment as shown, without departing from the invention herein set forth. The claims appended hereto are not to be considered as limited by the particular embodiment shown but are intended to cover all such modifications thereof as fall within the spirit and scope of such claims.

What is claimed as new and which it is desired to secure by Letters Patent of the United States is:

1. A method of cutting a spirally wound magnetic core which comprises a plurality of spirally wound radially nested superposed laminations of magnetic core strip material, with each lamination being in direct physical contact with adjacent laminations comprising the steps of mounting the core on a central mounting member, contacting the outside portion of the core over the central mounting member by a movable wedge-shaped blade, contacting the opposite outside portion of the core by a movable surface, compressing the core between said movable blade and said movable surface to place the laminations of the core under stress and then forcing said wedge-shaped blade through the stressed laminations of the core to thereby separate each lamination of the core.

2. A method of cutting a spirally wound magnetic core which comprises a plurality of spirally wound, radially nested superposed laminations of magnetic core strip material, with each lamination being in direct physical contact with adjacent laminations comprising the steps of mounting the core on a central mounting member, contacting the outside portion of the core over the central mounting member by a movable wedge-shaped blade, contacting the opposite outside portion of the core by a movable surface, compressing the core between said movable blade and said movable surface to place the laminations of the core under stress, forcing said wedge-shaped blade through each of said laminations to cause said laminations to buckle under the force of said blade thereby separating the surface portions of said laminations on each side of said blade from the surface of the next succeeding lamination and then cause said lamination to part at the point of blade pressure.

3. An apparatus for cutting a spirally wound magnetic core in which the laminations of the core are in direct physical contact with adjacent laminations comprising an anvil means for mounting a core about its central opening, a movable blade member, a movable table member, means for moving said movable blade into contact with the outer portion of a core resting on said anvil means, means for moving said movable table into contact with the opposite outer portion of a core, said means for moving said blade and said means for moving said table being operative to compress a core between said movable blade and said movable table and said means for moving said movable blade being further operative to force said movable blade through the laminations of the core.

References Cited in the file of this patent
UNITED STATES PATENTS

| | | |
|---|---|---|
| 1,935,426 | Acly | Nov. 14, 1933 |
| 1,963,644 | Bronander | June 19, 1934 |
| 2,263,231 | Zimmerman | Nov. 18, 1941 |
| 2,305,649 | Vienneau | Dec. 22, 1942 |
| 2,456,457 | Somerville | Dec. 14, 1948 |
| 2,478,029 | Vienneau | Aug. 2, 1949 |
| 2,804,140 | Van Riper | Aug. 27, 1957 |
| 2,947,065 | Moody | Aug. 2, 1960 |
| 3,100,414 | Watkins | Aug. 13, 1963 |